United States Patent
Gileff et al.

(10) Patent No.: US 7,190,147 B2
(45) Date of Patent: Mar. 13, 2007

(54) BATTERY WITH COMPLETE DISCHARGE DEVICE

(75) Inventors: Mike Gileff, British Columbia (CA); Maurice J. Brulé, British Columbia (CA)

(73) Assignee: Eagle-Picher Technologies, LLC, Joplin, MO (US)

( * ) Notice: Subject to any disclaimer, the term of this patent is extended or adjusted under 35 U.S.C. 154(b) by 268 days.

(21) Appl. No.: 10/792,367

(22) Filed: Mar. 3, 2004

(65) Prior Publication Data

US 2005/0194927 A1    Sep. 8, 2005

Related U.S. Application Data

(60) Provisional application No. 60/514,158, filed on Oct. 24, 2003.

(51) Int. Cl.
*H01M 10/46* (2006.01)
(52) U.S. Cl. ..................................... 320/127
(58) Field of Classification Search ............... 320/107, 320/112, 127, 135; 429/99, 100
See application file for complete search history.

(56) References Cited

U.S. PATENT DOCUMENTS

| | | | |
|---|---|---|---|
| 3,861,960 A | 1/1975 | Parker et al. ............... 136/107 |
| 4,407,909 A * | 10/1983 | Goebel ......................... 429/50 |
| 4,648,015 A | 3/1987 | Davis et al. .................. 363/15 |
| 4,734,635 A | 3/1988 | Theobald ...................... 320/13 |
| 4,906,210 A | 3/1990 | McNiel ....................... 439/663 |
| 5,119,009 A | 6/1992 | McCaleb et al. ............. 320/13 |
| 5,651,821 A | 7/1997 | Uchida ....................... 118/200 |
| 6,147,472 A | 11/2000 | Hewes et al. ............... 320/135 |
| 6,270,916 B1 | 8/2001 | Sink et al. ...................... 429/7 |
| 6,340,320 B1 | 1/2002 | Ogawa ........................ 439/824 |

FOREIGN PATENT DOCUMENTS

DE    41 41 488    12/1992
EP    1 146 579    10/2001

* cited by examiner

*Primary Examiner*—Edward H. Tso
(74) *Attorney, Agent, or Firm*—Wood, Herron & Evans, L.L.P.

(57) ABSTRACT

A battery having a complete discharge mechanism includes a spring-biased switch with an element spring-biased from the switch and acts to close the switch when in a fully extended position. A block is position above the element with a passageway aligned with the element. A flexible positioned between the element and the passage prevents the element from extending into the passage. The tab extends through the battery casing. When pulled the tab allows the element to extend into the passage thereby closing the spring-biased switch and completing the discharge circuit.

1 Claim, 2 Drawing Sheets

BATTERY WITH COMPLETE DISCHARGE DEVICE

This application is a regular utility application claiming priority from provisional U.S. patent application Ser. No. 60/514,158, filed on Oct. 24, 2003.

BACKGROUND OF THE INVENTION

Discarded partially discharged batteries can present a significant danger. Alkali metal batteries present a particular problem. Because the alkali metal such as lithium will burn when exposed to water, a partially discharged battery presents a significant concern.

In order to address this issue, many lithium batteries incorporate a circuit to completely discharge the battery. After the battery has discharged to the point where it is no longer useful, the complete discharge circuit is activated, totally consuming the lithium, thereby reducing or eliminating any fire hazard.

One such device is disclose in McCaleb U.S. Pat. No. 5,119,00. This patent discloses a one-time switch used to close a complete discharge circuit. It requires that a pointed object push a switch element into the battery casing, closing the one-time switch. The battery then completely discharges and can be safely disposed.

Sink et al U.S. Pat. No. 6,270,916 utilizes a different discharge circuit. Instead of a switch, it uses a spring clip which contacts a conductor, closing the circuit. In order to prevent discharge, an insulating strip is place between the clip and the conductor. When it is desired to discharge the battery, the strip is removed, the spring clip then makes contact with the conductor, and the battery discharges. This has the advantage of not requiring a separate device to close the switch.

If the spring clip is not properly biased, the proper contact will not be made. Further, if the insulator strip is improperly positioned, it can cause a premature discharge of the battery. Moisture can also cause the circuit to close.

SUMMARY OF THE INVENTION

The present invention is premised on the realization that a complete discharge device (CDD) for a battery, in particular a lithium battery, can employ a spring biased switch. A spring biased switch has an element which, when in an extended position, is closed. The device also includes a block or other structure that has a bore or opening that aligns with this spring biased element. A tab inserted between the spring biased element of the switch and the opening in the block prevents the spring-biased element from extending outward and keeps the switch on the complete discharge device in an open position. When the tab is pulled, the spring in the switch forces the element outward, thereby closing the switch and activating the complete discharge device. Preferably, the element is simply a post.

The invention will be further appreciated in light of the following detailed description and drawings in which:

DETAILED DESCRIPTION OF THE DRAWINGS

Figure 1:
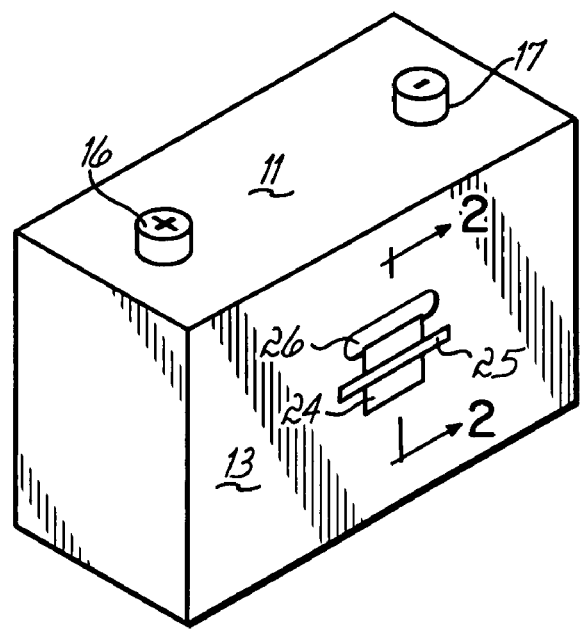
FIG. 1 is a perspective view of a battery incorporating the present invention.
Figure 2:
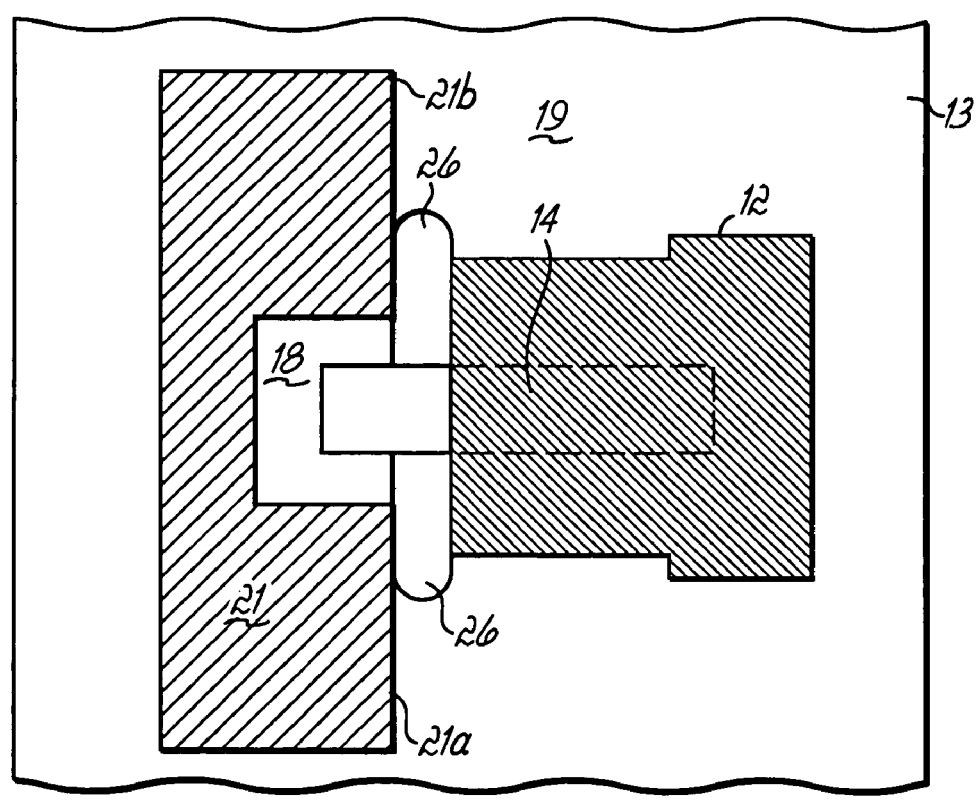
FIG. 2 is a perspective view partially broken away showing the switch mechanism according to the present invention in the closed position.

As shown in FIGS. 1 and 2, the complete discharge circuit 10 of the present invention is encased within a battery 11 and designed to connect a load across the cell strings of a battery, thereby discharging it completely. The battery 11 includes a top wall 13 having positive and negative terminals 16 and 17. The complete discharge switch 12 is located on the inside surface 19 of front wall 13 of the battery. The switch 12 can be located on the inside surface of any exterior wall of battery 11 or on a printed circuit board mounted within a battery and located where a tab 24 can be extended through an exterior wall.

Figure 3:
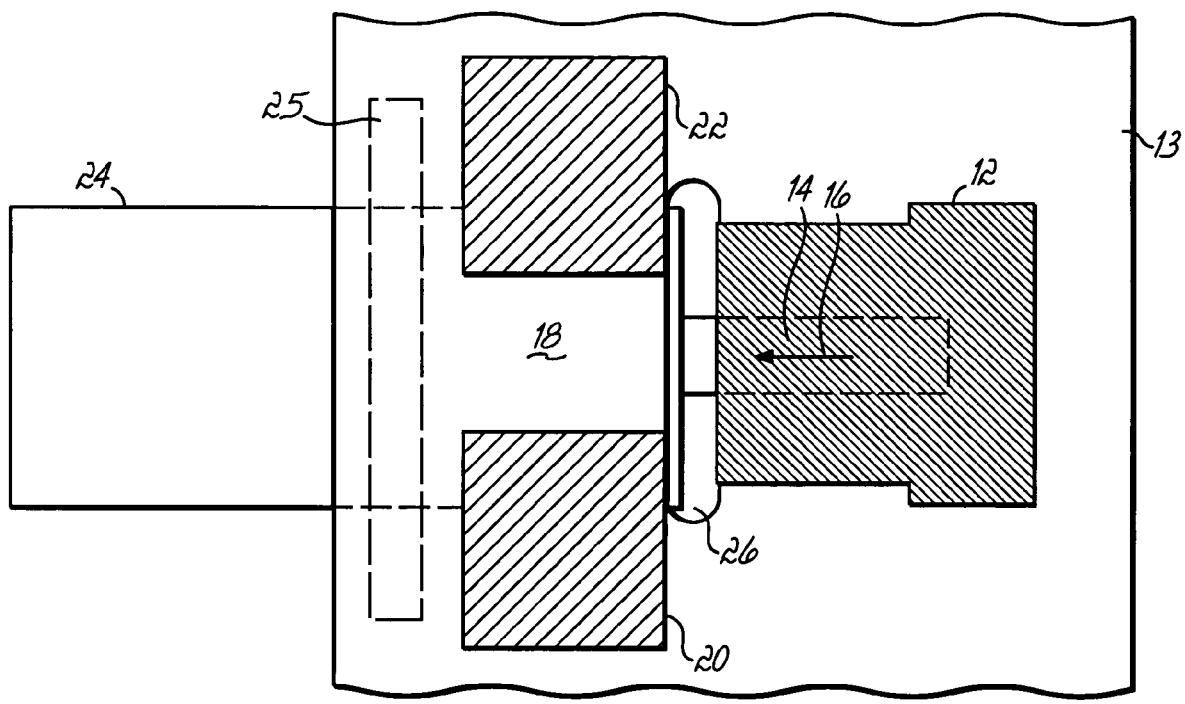
FIG. 3 is an alternate embodiment of the device shown in FIG. 2 with the switch in the open position.
Figure 4:
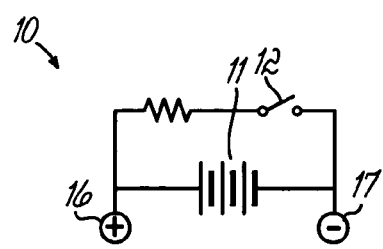
FIG. 4 is a circuit diagram showing a complete discharge circuit.

Switch 12 of circuit 10 includes a plunger element 14 spring biased in the direction of arrow 16. Element 14 is shown partially in phantom in the Figures. This element 14 is aligned with an opening 18 between two blocks or obstructions within the battery 11. The opening can be established by a structure 21 having blocks 21a and 21b as shown in FIG. 2, or, as shown in FIG. 3, can actually be two electrical components 20, 22 such as capacitors, resistors, or the like, which form part of the circuitry on the inside surface of wall 13. This surface 19 as shown is a circuit board which incorporates the CDD circuit.

As shown in FIG. 3, the switch is held in an open position by a pull tab 24 of a thermally stable yet flexible material such as polyester. This extends from the exterior of the battery through a slot 27 in the battery and slot 26 in surface 13 of circuit board 19 between blocks 21a, 21b and switch 12. Thus, tab 24 blocks the opening 18 and prevents the element 14 from moving in the direction of arrow 16.

On the exterior of battery 11, the tab 24 is held in place by a piece of pressure sensitive tape 25 to avoid inadvertent pulling and thus discharge of the battery 11. Other protective measures can also be employed such as a plastic cap or application of pressure sensitive adhesive to the exterior surface of tab 24 to adhere this portion to the exterior surface of battery 11.

To activate the complete discharge circuit, tape 25 is removed and tab 24 is pulled. As shown in FIG. 2, element 14 then moves into opening 18, thereby closing the switch and closing the circuit 10 causing the device to discharge completely. The discharge is controlled by circuit 10 to allow a controlled discharge of the battery so that excess heat is not generated and fire danger is reduced. A constant resistance circuit is shown. A constant current discharge can also be employed, if desired.

This system eliminates the problems associated with using simply an insulator between two conductors and yet provides a simple, easy method for activating a complete discharge circuit.

Having described this invention, its advantages and parameters, it will be obvious to a person of ordinary skill in the art, in view of the above description, that variations thereof may be made without departing from the spirit and scope thereof.

What is claimed is:

1. A battery having a complete discharge mechanism;
   said mechanism including a switch having a spring-biased element wherein said element acts to close said switch when said element is fully extended;

said battery having two spaced electrical components creating a passage;
said passage aligned with said element and adapted to receive said element;
a tab extended between said blocks, positioned between said element and said passage, said tab preventing said element from extending into said passage; and
said tab extending through a casing of said battery;
whereby pulling said tab allows said element to enter said passage and close said switch thereby activating said complete discharge mechanism.

* * * * *